United States Patent [19]

Willis

[11] 4,387,324
[45] Jun. 7, 1983

[54] REMOTE RESPONSIVE TELEVISION RECEIVER FERRORESONANT POWER SUPPLY PROTECTION CIRCUIT

[75] Inventor: Donald H. Willis, Indianapolis, Ind.

[73] Assignee: RCA Corporation, New York, N.Y.

[21] Appl. No.: 321,957

[22] Filed: Nov. 16, 1981

[51] Int. Cl.³ .............................................. H01J 29/70
[52] U.S. Cl. ..................................... 315/411; 358/190
[58] Field of Search ................. 315/408, 411; 358/190

[56] References Cited

U.S. PATENT DOCUMENTS

| | | | |
|---|---|---|---|
| 2,913,621 | 11/1959 | Luther, Jr. et al. | 315/20 |
| 3,860,748 | 1/1975 | Everhart et al. | 178/6 |
| 3,949,403 | 4/1976 | Yoshida et al. | 343/225 |
| 4,024,577 | 5/1977 | Diethelm | 358/190 |
| 4,234,829 | 11/1980 | Willis | 315/411 |

Primary Examiner—Theodore M. Blum
Attorney, Agent, or Firm—E. M. Whitacre; P. J. Rasmussen; Joseph Laks

[57] ABSTRACT

In a television receiver regulated power supply that is responsive to the state of a remote on/off command signal, the AC mains supply voltage is connected to the input terminals of a bridge rectifier through the mechanical switch portion of an on/off relay. A remote control circuit energizes the relay coil to close the mechanical switch upon receipt of the on-state command signal. The bridge rectifier then develops an unregulated DC voltage that is applied to a high frequency inverter for developing an alternating polarity input voltage. The alternating polarity input voltage is applied to a self-regulating or ferroresonant power supply circuit to produce regulated output voltages for various television receiver load circuits such as the ultor load and the horizontal deflection circuit. During a fault operating condition of the self-regulating circuit wherein the output voltages would tend to increase excessively, a protection circuit detects the occurrence of the fault operating condition and disables the remote control circuit to deenergize the relay coil and open the mechanical on/off switch. Operation of the self-regulating circuit stops to thereby deenergize the television receiver load circuits.

8 Claims, 1 Drawing Figure

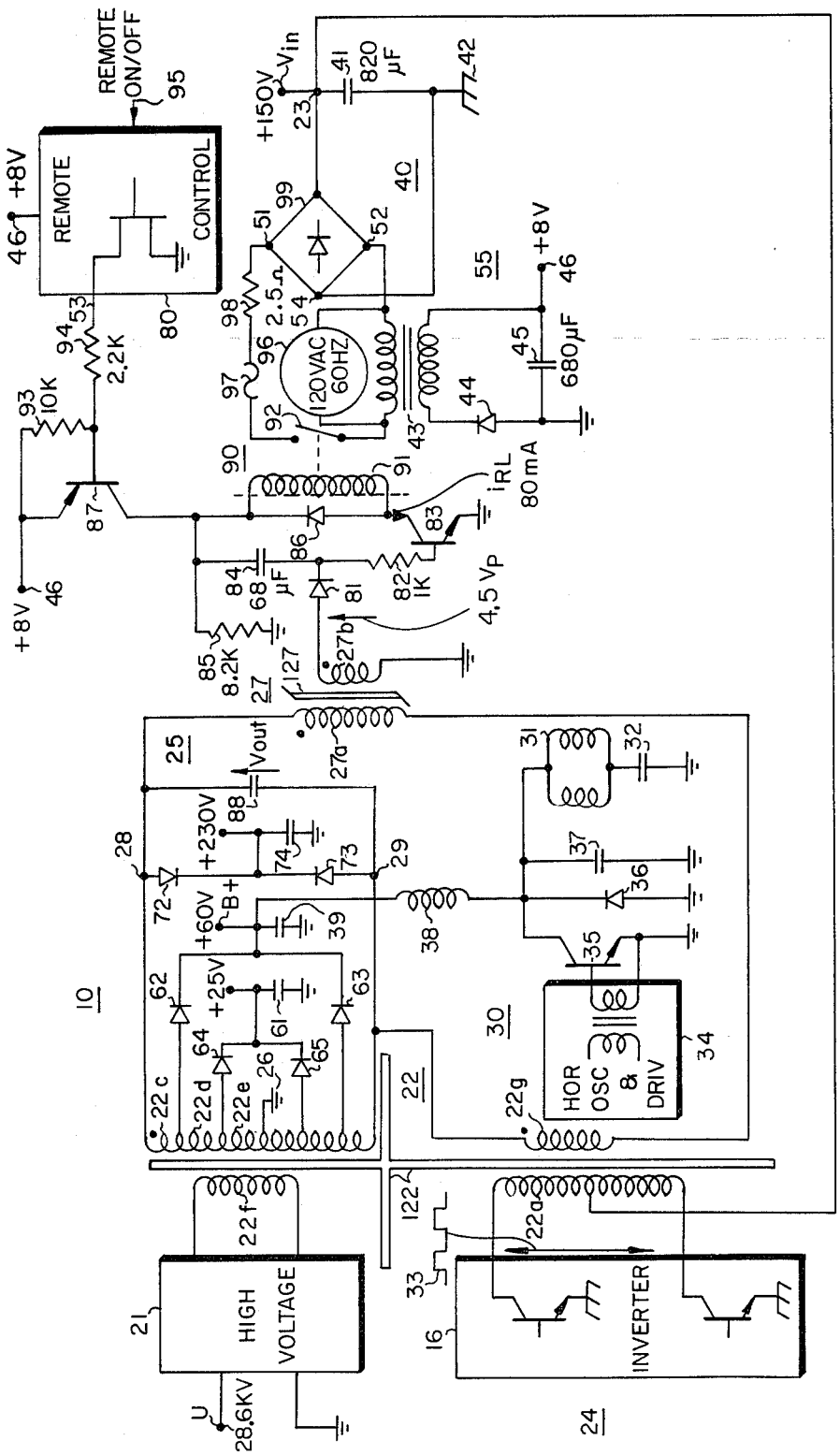

REMOTE RESPONSIVE TELEVISION RECEIVER FERRORESONANT POWER SUPPLY PROTECTION CIRCUIT

This invention relates to television receiver ferroresonant power supply protection circuits.

A ferroresonant power supply may be used to provide a regulated ultor voltage and a regulated B+ scanning voltage for a television receiver. When operated at a relatively high input frequency, such as the horizontal deflection frequency of about 16 KHz, a ferroresonant power supply is a relatively compact and low weight unit that provides inherent output voltage regulation without the need for a relatively complex and expensive electronic regulator control circuit.

In the U.S. patent applications of D. H. Willis, Ser. No. 220,847, filed Dec. 29, 1980, entitled "TELEVISION RECEIVER FERRORESONANT LOAD POWER SUPPLY", and Ser. No. 255,396, filed Apr. 20, 1981, entitled "TELEVISION RECEIVER FERRORESONANT LOAD POWER SUPPLY WITH REDUCED SATURABLE REACTOR CIRCULATING CURRENT", both herein incorporated by reference, a ferroresonant power supply is described wherein a source of unregulated alternating polarity voltage is coupled to the primary winding of a high leakage inductance power transformer. A ferroresonant saturable reactor load circuit is coupled across a secondary output winding of the high leakage transformer. A plurality of other secondary output windings, including a high voltage output winding, are magnetically tightly coupled to the first-mentioned secondary output winding.

Various television receiver direct voltages are derived from the alternating polarity voltages developed across the transformer secondary windings, including an ultor accelerating potential derived from the voltage developed across the high voltage winding and a B+ scanning voltage derived from the voltage developed across a low voltage winding. The ferroresonant load circuit regulates the voltage developed across one of the transformer secondary windings, thereby regulating the voltages developed across all the other tightly coupled secondary windings.

The self-regulating or ferroresonant load circuit comprises a saturable reactor and a capacitor coupled across the high leakage transformer secondary output winding. During each half cycle of the alternating polarity output voltage, the core of the saturable reactor magnetically saturates to develop a circulating current between the capacitor and a winding of the saturable reactor, thereby regulating, by ferroresonant operation, the alternating polarity output voltage. In the second of the aforementioned Willis U.S. patent applications, an additional winding of the high leakage transformer primary winding is conductively coupled in series with the ferroresonant saturable reactor winding across the ferroresonant load circuit capacitor and between two terminals of the transformer secondary output winding. Such an arrangement enables the ferroresonant load circuit to provide relatively good output voltage regulation at reduced circulating current levels.

A fault operating condition may arise wherein the saturable reactor winding becomes disconnected from the transformer secondary winding. In such a situation, the transformer secondary output voltages and the ultor accelerating potential undesirably tend to increase in amplitude. In the U.S. patent application of D. H. Willis, Ser. No. 298,973, filed Sept. 3, 1981, entitled "TELEVISION RECEIVER FERRORESONANT LOAD POWER SUPPLY DISABLING CIRCUIT", a ferroresonant power supply protection circuit is described that disables a load circuit, such as the heater filaments of the cathode electrodes of a color picture tube, during the above-described fault operating condition. The heater filaments are normally energized by the voltage developed across the saturable reactor winding. If the winding becomes disconnected from the high leakage transformer, normal energization of the filaments is disrupted, preventing the emission of excessive X-radiation and presenting a blank picture screen to the observer.

It may, however, be desirable to design a protection circuit that removes all of the ferroresonant power supply secondary output voltages when the protective circuit is activated. In a television receiver that has remote on/off control, a feature of the invention is the use of the remote control circuit as part of the ferroresonant power supply protection circuit.

A source of voltage is provided that is available during both states of a remote on/off command signal. A voltage supply circuit develops an input voltage upon application thereto of the available voltage. A remote control circuit is coupled to the available voltage source and to the input voltage supply and is responsive to the remote on/off command signal for applying the available voltage to the input voltage supply during the on-state of the command signal. A power supply including a self-regulating circuit is energized by the input voltage and produces a regulated supply voltage. A protection circuit is coupled to the remote control circuit and is responsive to a fault operating condition of the self-regulating circuit for disabling the remote control circuit to discontinue the application of the available voltage to the input voltage supply upon the occurrence of a fault operating condition.

The FIGURE illustrates a deflection circuit and ferroresonant power supply that includes a protection circuit embodying the invention.

In the FIGURE, a power supply 10 of a remote responsive television receiver or television display system includes a source 24 of alternating input voltage 33 and a high leakage inductance power transformer 22. Alternating voltage source 24 comprises a source 40 of unregulated direct voltage, Vin, developing illustratively +150 volts at an input terminal 23, and a high frequency inverter 16 coupled to the primary winding 22a of power transformer 22. Input terminal 23 is coupled to a center tap of primary winding 22a.

The direct voltage source 40 comprises a source 96 of 120 VAC, 60 Hz, power line or mains supply voltage, coupled across input terminals 51 and 52 of a full-wave bridge rectifier 99 having an output terminal coupled to terminal 23 and a filter capacitor 41 coupled between terminal 23 and the current return terminal 54 of the bridge rectifier. Current return terminal 54 comprises an earth ground 42 that is not conductively isolated from the mains supply source 96. Mains supply source 96 is coupled to terminal 51 of bridge rectifier 99 through the mechanical switch portion 92 of a remote responsive on/off relay 90, a fuse 97, and a current limiting resistor 98. When mechanical switch 92 is in the closed position, the unregulated DC input voltage Vin is developed at terminal 23 and energizes inverter 16.

Inverter 16 is operated at a relatively high frequency, such as the horizontal deflection frequency of illustratively 15.75 KHz, to develop across primary winding 22a the rectangular or square-wave voltage 33. Square-wave voltage 33, when applied to primary winding 22a of transformer 22, develops an alternating polarity voltage across each of secondary output windings 22c–22f. Secondary windings 22c–22e have a common center tap that is connected to a chassis ground 26, conductively isolated from earth ground 42.

The alternating polarity output or supply voltage developed across winding 22c is full-wave rectified by diodes 72 and 73 and filtered by a capacitor 74 to develop a direct supply voltage, of illustratively +230 volts, to power such circuits as the television receiver picture tube driver circuits. The alternating polarity output voltage developed across winding 22e is full-wave rectified by diodes 64 and 65 and filtered by a capacitor 61 to develop a direct supply voltage, of illustratively +25 volts, to power such television receiver circuits as the vertical deflection and audio circuits. The alternating polarity output voltage developed across winding 22d is full-wave rectified by diodes 62 and 63 and filtered by a capacitor 39 to develop, at a B+ terminal, a B+ scan supply voltage to energize a horizontal deflection generator circuit 30.

Horizontal deflection circuit 30 comprises a horizontal oscillator and driver 34, a horizontal output transistor 35, a damper diode 36, a retrace capacitor 37, and an S-shaping or trace capacitor 32 coupled in series with a horizontal deflection winding 31 across horizontal output transistor 35. Horizontal deflection generator 30 is coupled to the B+ terminal through an inductor 38 and develops a horizontal scanning current in horizontal deflection winding 31.

The alternating polarity voltage developed across a high voltage winding, secondary winding 22f, is coupled to a high voltage circuit 21 to develop an ultor accelerating potential at a terminal U for a color picture tube anode electrode, not illustrated, of the television receiver. High voltage circuit 21 may comprise a conventional voltage multiplier circuit of the Cockroft-Walton type, or may comprise a half-wave rectifier arrangement with a plurality of diodes integrally molded as a single unit with a plurality of winding sections, the winding sections not being individually illustrated in winding 22f.

The output voltage Vout across secondary output winding 22c, between terminals 28 and 29, is regulated by the ferroresonant operation of a self-regulating or ferroresonant load circuit 25. Ferroresonant load circuit 25 comprises a saturable reactor 27 including a magnetizable core 127 and a winding 27a located thereon, a capacitor 88 coupled between terminals 28 and 29, and a winding 22g of transformer 22 magnetically tightly coupled to winding 22a and conductively coupled in series with saturable reactor winding 27a across capacitor 88.

By being coupled to transformer secondary output winding 22c, ferroresonant load circuit 25 acts as a regulating load circuit to maintain the voltage across winding 22c as the regulated voltage Vout. With the voltage across secondary output winding 22c regulated by the ferroresonant operation of ferroresonant load circuit 25, the output voltages across all the other secondary windings that are tightly coupled to winding 22c, including high voltage winding 22f, are also regulated. Because of the loose magnetic coupling between primary winding 22a and the secondary windings 22c–22f, the voltages across these secondary windings can remain relatively unchanged in amplitude or half-cycle area, even though the voltage across the primary winding varies in amplitude.

Transformer 22, in combination with capacitor 88, develops an exciting current for saturable reactor winding 27a to generate a combined magnetic flux in core 127 that links winding 27a to produce the alternating polarity output voltage Vout. To regulate Vout by ferroresonant operation, capacitor 88 generates a circulating current during each half cycle of the alternating polarity output voltage that aids in magnetically saturating the core section of magnetizable core 127 that is associated with reactor winding 27a. As the saturable core section goes into saturation and comes out of saturation, the inductance exhibited by saturable reactor winding 27a switches between a low inductance state and a high inductance state. Under control of this switching action, which is a function of the saturation characteristics of the magnetizable material of core 127, the amplitude of the output voltage, the half-cycle area of the output voltage, or both the amplitude and half-cycle area are regulated against changes in the amplitude of the input voltage Vin and against changes in the loading on the various supply terminals including the ultor supply terminal U.

With the winding polarity of transformer winding 22c relative to winding 22g as shown in the FIGURE, the regulated output voltage Vout equals the difference between the voltage developed across saturable reactor winding 27a, the voltage being referenced to the undotted terminal of winding 27a, and the voltage developed across transformer winding 22g, the voltage being referenced to the undotted terminal of winding 22g. Such an arrangement provides for relatively good regulation of the voltage Vout at relatively low circulating current levels in ferroresonant load circuit 25. Because of the subtractive relationship of the aforementioned two voltages, an increase in the voltage across saturable reactor winding 27a due, for example, to an increase in the unregulated voltage Vin, is offset by an increase in the voltage across transformer winding 22g, thereby maintaining the output voltage Vout substantially unchanged in amplitude, half-cycle area, or both.

Ferroresonant power supply 10 is part of a remote responsive television receiver. In the FIGURE, remote on/off command signals are applied to a conventional remote control circuit 80 along a signal line 95. An output line 53 of remote control circuit 80 is coupled through a resistor 94 to the base of a switching element, transistor 87, of a switching arrangement comprising transistor 87 and a second switching element, transistor 83. A resistor 93 is coupled between the base and emitter electrodes of transistor 87. The emitter electrode of transistor 87 is coupled to a +8 volt supply voltage terminal 46.

The collector output electrodes of switching transistors 87 and 83 are connected to opposite ends of the coil 91 of remote responsive relay 90. The collector electrode of switching transistor 87 is coupled to the base control electrode of switching transistor 83 through a capacitor 84 and a resistor 82. A resistor 85 is coupled between chassis ground and the collector electrode of transistor 87. A snubber diode 86 is coupled across relay coil 91.

A standby power supply 55 provides the 8 volt supply voltage at terminal 46 to power the remote control circuitry both when the television receiver is in the on condition and when in the off or standby condition. The +8 volt standby supply is derived from the mains supply source 96 because the mains source is available during both states of the remote on/off command signal being developed on signal line 95. The mains supply voltage is stepped down by a transformer 43, rectified by a diode 44, and filtered by a capacitor 45 to produce the +8 volts DC at terminal 46.

Assume the television receiver is in the off or standby condition with mechanical switch 92 of relay 90 in the open position and with the signal on output line 53 of remote control circuit 80 in the high state to reverse bias switching transistor 87. To turn the television receiver on, the on-state of the remote on/off command signal is received on signal line 95, resulting in a low signal being developed on output line 53 to forward bias transistor 87 into saturated conduction. Collector current from transistor 87 flows to the base of the second switching transistor 83 through the initially uncharged capacitor 84 and through resistor 82.

Capacitor 84 begins charging to a positive value at its upper plate during the start-up interval after receipt of the on-state command signal. Transistor 83 is switched on, enabling relay current $i_{RL}$ to flow in relay coil 91 from the +8 volt terminal 46 through transistor 87 to chassis ground through transistor 83.

Current flowing in relay coil 91 actuates the mechanical switch 92 into the closed position, electrically connecting the mains supply source 96 to the bridge rectifier 99. When mechanical switch 92 is closed, voltage is developed at input terminal 23 to energize alternating voltage source 24.

During the start-up interval, inverter 16 free runs at a frequency below that of the horizontal deflection frequency, at a frequency of illustratively 5 to 10 KHz, as described in the U.S. patent application of D. W. Luz et al., Ser. No. 174,943, filed Aug. 4, 1980, entitled "TELEVISION RECEIVER, PUSH-PULL INVERTER, FERRORESONANT TRANSFORMER POWER SUPPLY SYNCHRONIZED WITH HORIZONTAL DEFLECTION", herein incorporated by reference. The free-running frequency of inverter 16 is sufficiently high to produce a voltage between terminals 28 and 29 that is a substantial percentage of the steady-state output voltage value.

During the start-up interval with inverter 16 in operation, an alternating polarity voltage is developed across saturable reactor winding 27a to produce an alternating polarity voltage across saturable reactor winding 27b. The alternating polarity voltage from saturable reactor winding 27b is rectified by a diode 81 and applied to the base of transistor 83 through a resistor 82. The rectified voltage sustains conduction of transistor 83 even during the steady-state interval after the elapse of the start-up interval when capacitor 84 has charged to its steady-state value and cannot supply base current to transistor 83. With conduction of transistor 83 sustained during the steady-state interval by the voltage being developed across saturable reactor winding 27b, the flow of relay current $i_{RL}$ in relay coil 91 is not interrupted during normal operation of the television receiver. In the steady-state, operation of inverter 16 has changed from free-running to one that is synchronized with horizontal deflection. The frequency of inverter 16 is now the horizontal deflection frequency, enabling ferroresonant load circuit 25 to operate in the ferroresonant mode to produce the steady-state output voltage Vout.

To turn the television receiver off, or into the standby condition, the off-state of the on/off command signal is received on signal line 95, producing a low state signal on output line 53 to turn off switching transistor 87. Capacitor 84 discharges into the relay coil 91, and the relay current $i_{RL}$ decays to zero, to open mechanical switch 92. With capacitor 84 discharged, the television receiver can again be turned on upon receipt of the on-state of the on/off command signal. Resistor 85 is provided to ensure satisfactory discharge of capacitor 84.

A fault operating condition of ferroresonant power supply 10 may arise wherein saturable reactor winding 27a becomes disconnected from secondary output winding 22c, or becomes internally disconnected or open circuited. With reactor winding 27a operatively disconnected, the output voltage Vout may tend to increase substantially. The output voltage Vout increases because the high leakage transformer 22 is no longer being loaded down by its connection to ferroresonant load circuit 25. Also, should capacitor 88 at the same time become disconnected from terminal 28 or 29, the output voltage Vout may increase. The increase in voltage Vout under this fault operating condition tends to undesirably increase the ultor accelerating potential at terminal U.

A feature of the invention is the disabling of the normal energization of the television receiver under such a fault operating condition. Another feature of the invention is the use of saturable reactor winding 27b not only as part of an on/off control circuit, but also as a protection circuit in the event the above-described fault operating condition occurs. In response to the operative disconnection of saturable reactor winding 27a from transformer winding 22c, the voltages across both winding 27a and winding 27b are substantially eliminated. Base current for switching transistor 83 is removed, cutting off conduction in the transistor. With transistor 83 nonconductive, relay coil 91 is deenergized, causing mechanical switch 92 to open, thereby shutting down ferroresonant power supply 10.

To discharge capacitor 84, the television receiver is placed in the standby condition by receipt of the off-state of the on/off command signal to turn off transistor 87. Capacitor 84 then discharges through resistor 85, winding 27b and diode 81. After correction of the fault condition, the television receiver may then again be turned on by receipt of an on-state command signal.

I claim:

1. A disabling circuit for a television display system regulated power supply responsive to the state of a remote on/off command signal, comprising:

a source of voltage available during both states of said remote on/off command signal;

means for developing an input voltage upon application thereto of said available voltage;

remote control means coupled to said available voltage source and to said input voltage developing means and responsive to said remote on/off command signal for applying said available voltage to said input voltage developing means during the on-state of said command signal;

means including a self-regulating circuit energized by said input voltage for producing a regulated supply voltage, said self-regulating circuit comprising a saturable reactor and a capacitance coupled to a winding thereof to magnetically saturate at least a portion of the core of said reactor;

a load circuit within said television display system energized by said regulated supply voltage; and means coupled to said remote control means and responsive to a fault operating condition of said self-regulating circuit for disabling said remote control means to discontinue the application of said available voltage to said input voltage developing means upon the occurrence of said fault operating condition.

2. A disabling circuit according to claim 1 wherein said regulated supply voltage producing means includes a transformer having said input voltage applied to a primary winding thereof and having said supply voltage produced across a secondary winding thereof, said self-regulating circuit being coupled to said transformer secondary winding as a load circuit to provide for the regulation of said supply voltage.

3. A disabling circuit according to claim 2 wherein said load circuit comprises an ultor high voltage generator coupled to said transformer secondary winding and wherein said self-regulating circuit is coupled to another winding of said transformer, with said firstmentioned transformer secondary winding stepping up the voltage developed across said other transformer secondary winding.

4. A disabling circuit according to claim 2 wherein said fault operating condition responsive means includes means for applying the alternating voltage that is developed across said saturable reactor winding during normal operation of said self-regulating circuit to said remote control means, and wherein said alternating voltage is substantially absent during the occurrence of said fault operating condition to disable said remote control means.

5. A disabling circuit according to claim 4 wherein said alternating voltage applying means comprises a second winding of said saturable reactor.

6. A disabling circuit according to claim 4 wherein said remote control means includes an on/off switch coupled to said available voltage source and to said input voltage developing means and a control switch responsive to said remote on/off command signal and to the alternating voltage across said saturable reactor winding for controlling the conduction state of said on/off switch.

7. A disabling circuit according to claim 6 wherein said on/off switch comprises an electromechanical relay including a relay coil and a mechanical switch portion actuated by current in said relay coil, and wherein said control switch includes first and second controllable switching elements, said first switching element being responsive to said remote on/off command signal and coupled to said available voltage source and to a first terminal of said relay coil, said second switching element being responsive to the alternating voltage developed across said saturable reactor winding and coupled to a second terminal of said relay coil.

8. A disabling circuit according to claim 7 wherein an output terminal of said first switching element is coupled to a control terminal of said second switching element through a capacitor to change the conductive state of said second switching element during a start-up interval after receipt of the on-state command signal to one that actuates said mechanical switch portion, and wherein the alternating voltage developed across said saturable reactor winding is applied to said second switching element control terminal during the steady-state interval to maintain said second switching element in the aforementioned one conductive state.

* * * * *